Patented Dec. 21, 1926.

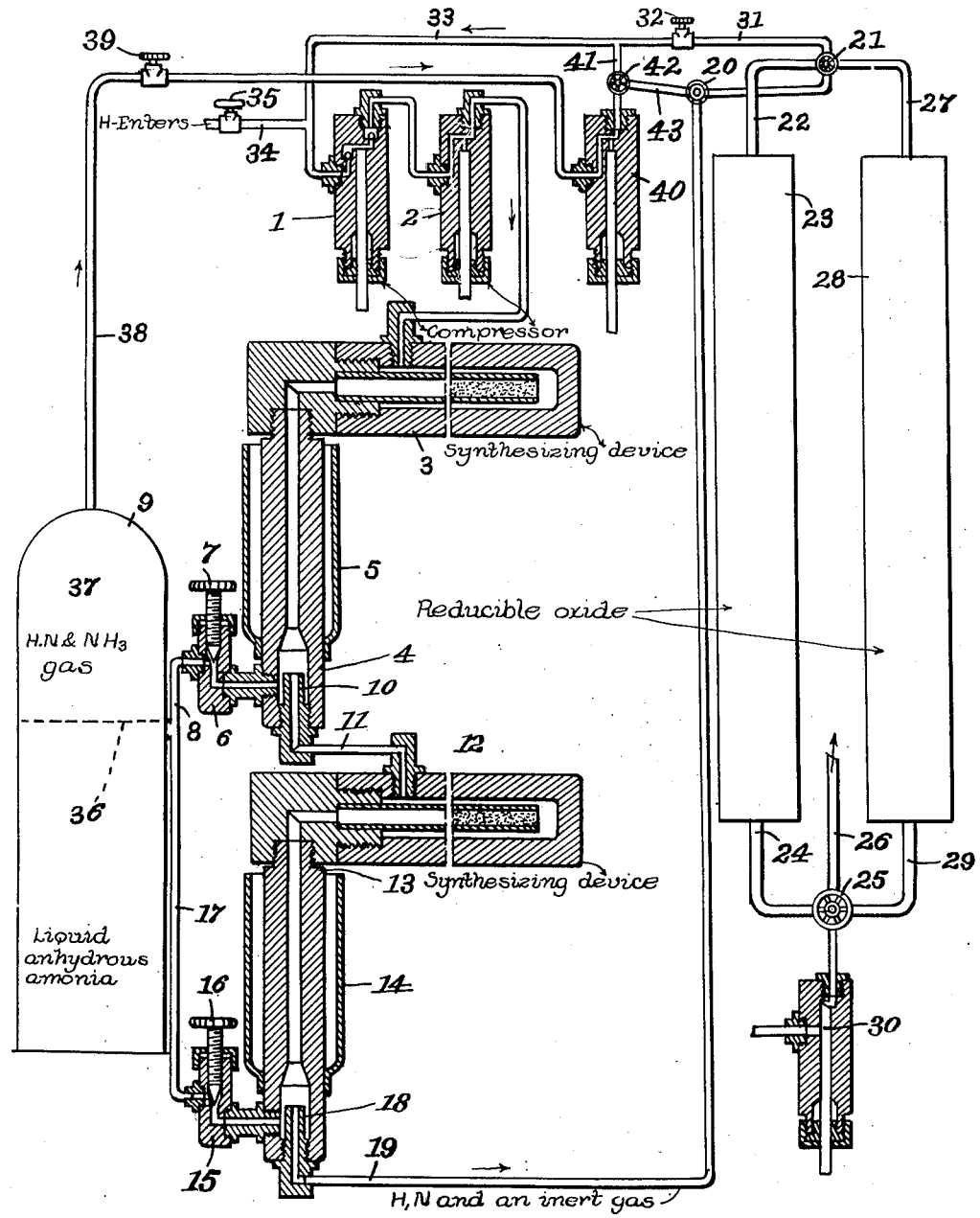

1,611,359

UNITED STATES PATENT OFFICE.

CHESTER MOTT, OF DENVER, COLORADO, ASSIGNOR TO COMPRESSED GAS CORPORATION, OF DENVER, COLORADO, A CORPORATION OF DELAWARE.

SYNTHETIC PRODUCTION OF AMMONIA.

Application filed October 9, 1922. Serial No. 593,395.

My invention relates to the production of synthetic ammonia, and more especially to the use of hydrogen that would otherwise be wasted in obtaining the hydrogen used in the process. My invention also relates to the use of hydrogen and nitrogen extracted with the ammonia from the ammonia producing circuit.

Analogous use of the otherwise wasted hydrogen is shown in my co-pending application Serial No. 582,700, filed August 18, 1922. In that application I show a device in which the mixture of hydrogen and nitrogen is passed repeatedly through the same synthesizing and ammonia separating device. This application refers more particularly to a system in which the mixture of hydrogen and nitrogen is passed over a series of successive synthesizing and ammonia separating devices.

Referring to the accompanying drawing, in which one form of my invention is shown diagrammatically, the mixture of hydrogen and nitrogen is shown entering a compressor 1 from which it passes to another compressor 2, and thence to a catalyzer bomb 3; from this it is passed through an ammonia separating device 5 illustrated as being a cooled pipe. The liquid anhydrous ammonia collected at the bottom of this pipe is passed off through the pipe 6 controlled by valve 7, to pipe 8, and from thence to the storage receptacle 9. The mixture of hydrogen and nitrogen from which the major portion of ammonia has been separated out passes through a nipple 10 and pipe 11 to another catalyst bomb 12 and from thence through pipe 13 with its cooling jacket 14. The liquid ammonia passes from the bottom of this pipe through a pipe 15 controlled by the valve 16 to a pipe 17, from which it passes into the storage receptacle 9. But two of these successive catalyst bombs and ammonia separators are shown, the device thus far described being essentially that shown in the patent to Claude, No. 1,332,460, dated March 2, 1920. A greater number of bombs and separators may be used in the circuit if desired, and my invention is in no way dependent upon any of the features claimed by Claude, his device being shown merely as one of those with which my invention may be operated to advantage. From the last ammonia separator, whether there be two or any number in the series, the pipe 19 leads off the remaining mixture of hydrogen and nitrogen.

In the aforementioned patent of Claude reference is made to the fact that the residue will contain a material amount of impurities such as argon, which unfits the mixture for passage through a synthesizing device. This residue is passed from pipe 19 through a valve 20 and a valve 21 and pipe 22 to a receptacle 23 containing some oxid which may be reduced by the hydrogen in the residue, for example, copper oxid. From the receptacle 23 the hydrogen and oxygen in the form of water with the residue of the nitrogen and inert gases are passed through pipe 24, valve 25 and pipe 26 to the atmosphere. When the oxid in the receptacle 23 has been reduced the valve 21 is turned so that the mixture will pass through pipe 27, receptacle 28, pipe 29, valve 25, and pipe 26, thus reducing the material in receptacle 28. While the material in receptacle 28 is being reduced air or any mixture of nitrogen, oxygen and inert gas is forced by pump 30 through valve 25 and pipe 24 into receptacle 23, where the material, such as proper, will be oxidized. From this receptacle 23 there will then issue the nitrogen and inert gas passing through pipe 22, valve 21, pipe 31, valve 32, and pipe 33, to the compressor 1. At the same time approximately three times the volume of hydrogen is allowed to enter through pipe 34 and valve 35.

Anhydrous ammonia will absorb certain quantities of uncombined hydrogen and nitrogen, and at the temperatures and pressures at which the ammonia will be separated in processes similar to that of Claude the amount of uncombined hydrogen and nitrogen so absorbed will be considerable. This mixture of the uncombined hydrogen and nitrogen with the ammonia renders the ammonia unfit for certain uses, such as refrigeration, and so the uncombined gases have to be separated off at some point. If the pressure is considerably reduced in the receptacle 9 and the temperature conditions are proper the uncombined gases will separate from the liquid ammonia to such an extent that the remaining liquid ammonia will be sufficiently pure for commercial purposes. The liquid level in the receptacle 9 is indicated at 36, and above this at 37 will be a mixture of uncombined hydrogen, nitrogen, and ammonia gas, the percentage of ammonia gas in the mixture depending upon the temperature and the pressure. From the tank 9 this mixture of hydrogen, nitrogen and ammonia gas may be led off through pipe 38 and valve 39 to a pump 40, from which it may be passed through valve 42 in the pipe 41 into a pipe entering compressor 1, as for example, the pipe 33. The pump 40 is necessary only when the pressure of the gas entering compressor 1 is greater than that at which the mixture is purged off from receptacle 9 and ordinarily will not be needed. As the percentage of ammonia in the mixture purged off through pipe 38 will always be considerable, the logical place to return it would be to the ammonia separating device rather than initially to the catalyst bomb, but ordinarily the amount of gas so purged would not be sufficient to justify the use of a separate high compression pump; where the plant is large enough to justify a separate pump for this purpose, however, it would be best to return this mixture from pipe 38 to the ammonia separating device rather than to the catalyst bomb. If, because of the materials used in the compressors 1 and 2, or for other reasons, it is undesirable to have the mixture from pipe 38 containing a considerable percentage of ammonia pass into these compressors, the hydrogen both uncombined and combined in this mixture may be utilized by passing it through pipe 43 to a valve 21, from which it may pass with the residue received from pipe 19 into receptacle 23 or 28.

While the maximum of efficiency is obtained in most synthesizing devices with hydrogen and nitrogen in their combining proportions, the proportions may be varied somewhat, as found desirable. In some instances, because of the nature of the catalyst used, or other reason, it may be found desirable to have an excess of nitrogen. If the system were a closed circuit, the residue from the ammonia separator returning in each instance through the synthesizing device, any departure from the exact combining proportions would be cumulative, so that a very slight inaccuracy in proportioning the mixture would become highly detrimental; but where a considerable proportion of the gas is finally purged off and not returned to the ammonia producing circuit, the inequality between the gases introduced and combined as ammonia remains fixed, the residue of the gas leaving at pipe 19 containing the same excess of hydrogen or nitrogen as the gas that enters the compressor, with a possible variation because of the varying solubility of the hydrogen and nitrogen in ammonia at various temperatures and pressures. Therefore, when the cost of the hydrogen is not a dominant factor a slight excess of hydrogen may be introduced intentionally so that the proportion of hydrogen in the residue passing out through pipe 19 may be quite high. In order to use the hydrogen to best advantage the capacities of the synthesizing devices and the proportions of the entering mixture, pressures, temperatures, etc., should be so related that the hydrogen in the residue passing through pipe 19 will be just sufficient to purify the nitrogen used in the process.

While this system is particularly adaptable to synthesizing devices which will cause the synthesis of a large proportion of the gases at one passage so that the series will not be long, it is not confined to such an arrangement as the proportion of gases synthesized at one passage through one synthesizing device merely determines the number of consecutive devices through which it is wise to pass the mixture. In all cases it is clear that the residue from the first ammonia separating device will be less than the mixture introduced into the first synthesizing device so that the successive synthesizing devices may be of lesser and lesser capacity, or several devices may be used in parallel for the first passage of the mixture and a fewer number for each successive passage. Broadly considered, it is immaterial whether the synthesizing device be a catalyst bomb or a means for producing synthesis electrically. These and various other obvious changes may be made within the scope of the appended claims.

I claim:

1. The process of producing ammonia which comprises passing a mixture of nitrogen, oxygen and inert gas over an oxidizable material to free the material from oxygen, mixing hydrogen with the nitrogen so purified, passing the mixture through a device adapted to cause a proportion of the nitrogen and hydrogen to combine and form ammonia, removing the ammonia from the mixture, passing the residue through another synthesizing device and again removing the ammonia, and continuing the process until the percentage of inert gas becomes materially increased and using the residue from the last ammonia separating device in the series to reduce the material oxidized in purifying nitrogen.

2. The process of producing synthetic ammonia comprising passing a mixture of nitrogen, oxygen and inert gas over oxidizable material to free the mixture from oxygen, mixing hydrogen with the nitrogen so purified, passing the mixture of hydrogen and nitrogen through a series of synthesizing and ammonia separating devices and using the hydrogen in the residue to reduce material oxidized in the purification of the nitrogen, the proportions of gases and the capacities of the synthesizing devices being so calculated that the hydrogen in the residue will reduce the amount of material necessary to purify the required nitrogen.

3. In a process for producing synthetic ammonia comprising passing hydrogen and nitrogen through a synthesizing device and the resulting mixture through a device for extracting the ammonia in liquid anhydrous form, the step of purging off from the ammonia so extracted a mixture of uncombined hydrogen and nitrogen with ammonia gas and using this mixture in the ammonia producing process.

4. The process in accordance with that set forth in claim 3 in which the purged mixture is returned to the synthesizing device.

In testimony whereof I hereunto affix my signature.

CHESTER MOTT.